United States Patent

Tsuzuku et al.

[11] 4,106,817
[45] Aug. 15, 1978

[54] APPARATUS FOR PNEUMATICALLY TRANSPORTING POWDERY OR GRANULAR MATERIALS

[75] Inventors: Akihiko Tsuzuku, Hiratsuka; Masao Tanazawa, Tokyo; Masashi Kaminishi, Hiratsuka; Haruo Imamura, Fujisawa, all of Japan

[73] Assignee: Kabushiki Kaisha Komatsu Seisakusho, Tokyo, Japan

[21] Appl. No.: 701,025

[22] Filed: Jun. 30, 1976

[30] Foreign Application Priority Data

| Jun. 30, 1975 | [JP] | Japan | 50-80694 |
| Jun. 30, 1975 | [JP] | Japan | 50-91395[U] |
| Jun. 30, 1975 | [JP] | Japan | 50-91396[U] |
| Jul. 31, 1975 | [JP] | Japan | 50-105149[U] |
| Jul. 31, 1975 | [JP] | Japan | 50-105150[U] |
| Jul. 31, 1975 | [JP] | Japan | 50-105151[U] |
| Jul. 31, 1975 | [JP] | Japan | 50-105152[U] |
| Aug. 27, 1975 | [JP] | Japan | 50-117008[U] |

[51] Int. Cl.² ............ B65G 51/02; B65G 53/00
[52] U.S. Cl. ............................. 302/17; 302/2 R
[58] Field of Search .............. 302/3, 11, 1, 17, 2 R, 302/26, 41, 42, 53; 15/104.06 R, 104.06 A; 73/3

[56] References Cited

U.S. PATENT DOCUMENTS

| 1,932,497 | 10/1933 | Wellensiek | 302/2 R |
| 2,736,611 | 2/1956 | Wesh | 302/17 |
| 3,115,278 | 12/1963 | Mylting | 302/3 |
| 3,419,209 | 12/1968 | Munn | 302/2 R |
| 3,955,853 | 5/1976 | Rusterholz | 302/17 |

FOREIGN PATENT DOCUMENTS

| 1,094,664 | 5/1955 | France | 302/53 |
| 2,054,419 | 5/1972 | Fed. Rep. of Germany | 302/17 |

Primary Examiner—Evon C. Blunk
Assistant Examiner—Jeffrey V. Nase
Attorney, Agent, or Firm—Armstrong, Nikaido, Marmelstein & Kubovcik

[57] ABSTRACT

Apparatus for pneumatically transporting powdery or granular materials from a material supply unit through a transport pipeline to a material receiver unit. A spherical secondary transport medium with an outside diameter slightly less than the inside diameter of the transport pipe is supplied one by one by a secondary transport medium supply device into the transport pipe so as to be located just behind the powdery or granular materials. Thus, the materials can be intermittently transported together with the spherical secondary transport medium through the transport pipeline at a relatively low speed.

16 Claims, 21 Drawing Figures

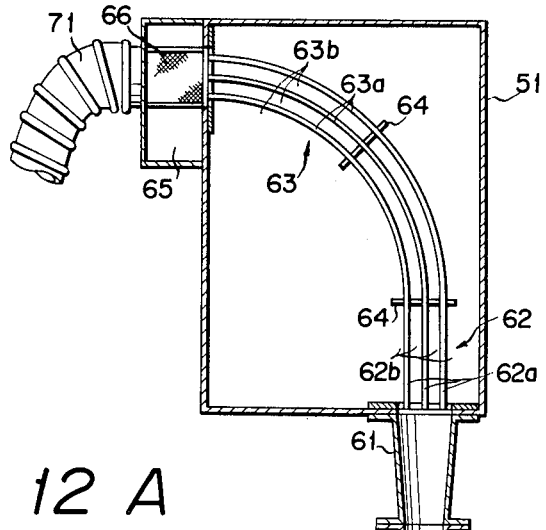
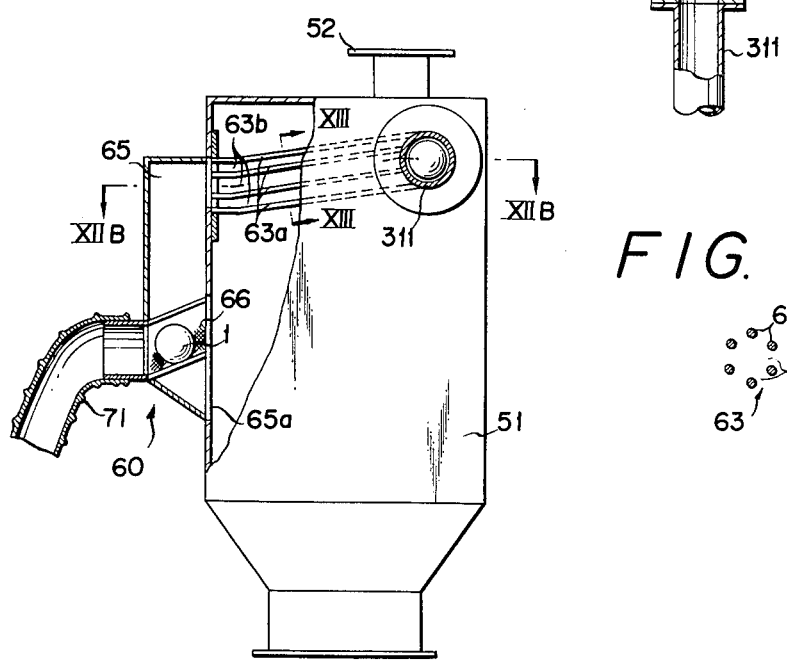
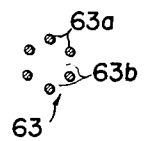

APPARATUS FOR PNEUMATICALLY TRANSPORTING POWDERY OR GRANULAR MATERIALS

BACKGROUND OF THE INVENTION

1. Field of the Invention

This invention relates to an improvement of an apparatus for pneumatically transporting powdery or granular materials, and more particularly to the apparatus comprising a material supply unit, a material receiver unit and a transport pipeline in which a spherical secondary transport medium with an outside diameter slightly less than the inside diameter of the transport pipeline is fed one by one just behind the materials to be transported, whereby transporting intermittently the materials together with the spherical secondary transport medium from the material supply unit through the transport pipeline to the material receiver unit at a relatively low speed by the action of fluid under pressure.

2. Description of the Prior Art

There has been known the pneumatic transportation system in which compressed air is introduced into a pressure chamber so as to transport a powdery or granular material through a transport pipeline. In this case, the powdery or granular materials supplied into the system can be continuously transported by floating it on airflow caused in the transport pipeline. However, such system is allowed to perform the pneumatic transportation of the materials in the transport pipeline only when the back pressure therein is lower than pneumatics supplied thereinto, and therefore is not adapted for the transportation in a large level thereof and of materials difficult to be transported, that is; materials which tend to clog the transport pipeline. Further, the compressed air employed in the above-mentioned conventional system is generally required to be kept at a relatively high speed such as, for example, 20 to 40 m/sec. Therefore, such system is disadvantageous in that powdery or granular materials are sometimes broken, or the transport pipeline tends to be worn away. On the contrary, if the speed of the compressed air or fluid under pressure is further reduced, the powdery or granular materials become unable to float or suspend on the air current so as to adhere to or deposit on the bottom part of the transport pipeline. If the speed of the compressed air is reduced much more, the powdery or granular material will accumulate gradually within the transport pipeline to form a plug, and finally clog the transport pipeline.

According to our investigations, as for the appropriate prior art most pertinent to the present invention, there is a system referred to as "plug transportation" in which the material to be transported is formed in a plug shape in the transport pipeline so as to permit the material to be transported through the latter. However, the above-mentioned prior art plug transportation system could be achieved under extremely limited conditions, since such transportation system depends largely on various factors such as the physical property of the material to be transported, the inside diameter of the transport pipeline, the amount of the compressed air and the method of flowing the latter etc.

SUMMARY OF THE INVENTION

The present invention has been made to eliminate the disadvantages, contraditions and the inconveniences of the above-described prior art apparatus.

It is therefore a primary object of the present invention to provide an apparatus for pneumatically transporting throughout a transport pipeline powdery or granular materials supplied from a material supply unit and introduced into the transport pipeline to a material receiver unit located at a predetermined position by the interposition of a spherical secondary transport medium which is fed one by one into the transport pipeline just behind the materials to be transported so as to be propelled therein together with the materials by the action of pneumatics.

Another object of the present invention is to provide an improved and novel transport apparatus capable of transporting various kinds of powdery or granular materials with adhesive and abrasive properties or including foreign matters.

A still another object of the present invention is to provide an improved and novel transport apparatus capable of transporting powdery or granular materials at a comparatively low speed.

A further object of the present invention is to provide an improved and novel transport apparatus which enables materials to be transported in the vertical direction which has been difficult for the prior art apparatus.

A further object of the present invention is to provide an improved and novel transport apparatus having a device which facilitates the separation of materials transported from the secondary transport medium.

A further object of the present invention is to provide an improved and novel transport apparatus which enables the use of large diameter transport pipes so that powdery or granular materials to be transported can be, fed through the latter in a large amount.

A further object of the present invention is to provide an improved and novel transport apparatus capable of transporting powdery or granular materials by the action of pressurized airflow with a comparatively low pressure as compared with that in the prior art plug transportation system.

A further object of the present invention is to provide an improved and novel apparatus for transporting powdery or granular materials which includes a device for controlling the amount of materials to be transported.

In accordance with the present invention, there is provided an improvement of a transport apparatus for pneumatically transporting powdery or granular materials which comprises a material supply unit, a material receiver unit and a transport pipeline connected between the material supply and receiver units, characterized by the novel combination comprising spherical secondary transport medium with an outside diameter slightly less than the inside diameter of the transport pipeline and adapted to be positioned just behind the material to be transported within the transport pipeline so that the material may be transported in the transport pipeline together with the spherical secondary transport medium by the action of pressurized fluid flow such as, for example, airflow under pressure, a secondary transport medium supply device located in the vicinity of said material supply unit for feeding said spherical secondary transport medium to said position in the transport pipeline, a separation device mounted within said material receiver unit for separating said spherical secondary transport medium from the material transported together with the former, and a secondary transport medium collecting device for collecting and returning the secondary transport medium separated from the powdery or granular material to said secondary transport medium supply device.

BRIEF DESCRIPTION OF THE DRAWINGS

These and other objects, features and attendant advantages if the present invention will become apparent from the following detailed description taken in conjunction with the accompanying drawings, in which:

FIGS. 9A and 9B show another embodiment of the secondary transport supply device in which FIG. 9A is a fragmentary sectional view taken along line IXA — IXA in FIG. 9B, whilst FIG. 9B is the same taken on line IXB — IXB in FIG. 9A;

FIG. 12A is a fragmentary vertical sectional view showing one embodiment of separation device mounted within the material receiver unit of the apparatus;

FIG. 12B is a transverse sectional view taken along line XIIB — XIIB in FIG. 12A;

FIG. 13 is a fragmentary cross-sectional view taken along line XIII — XIII in FIG. 12;

DETAILED DESCRIPTION OF THE PREFERRED EMBODIMENTS

Figure 1:
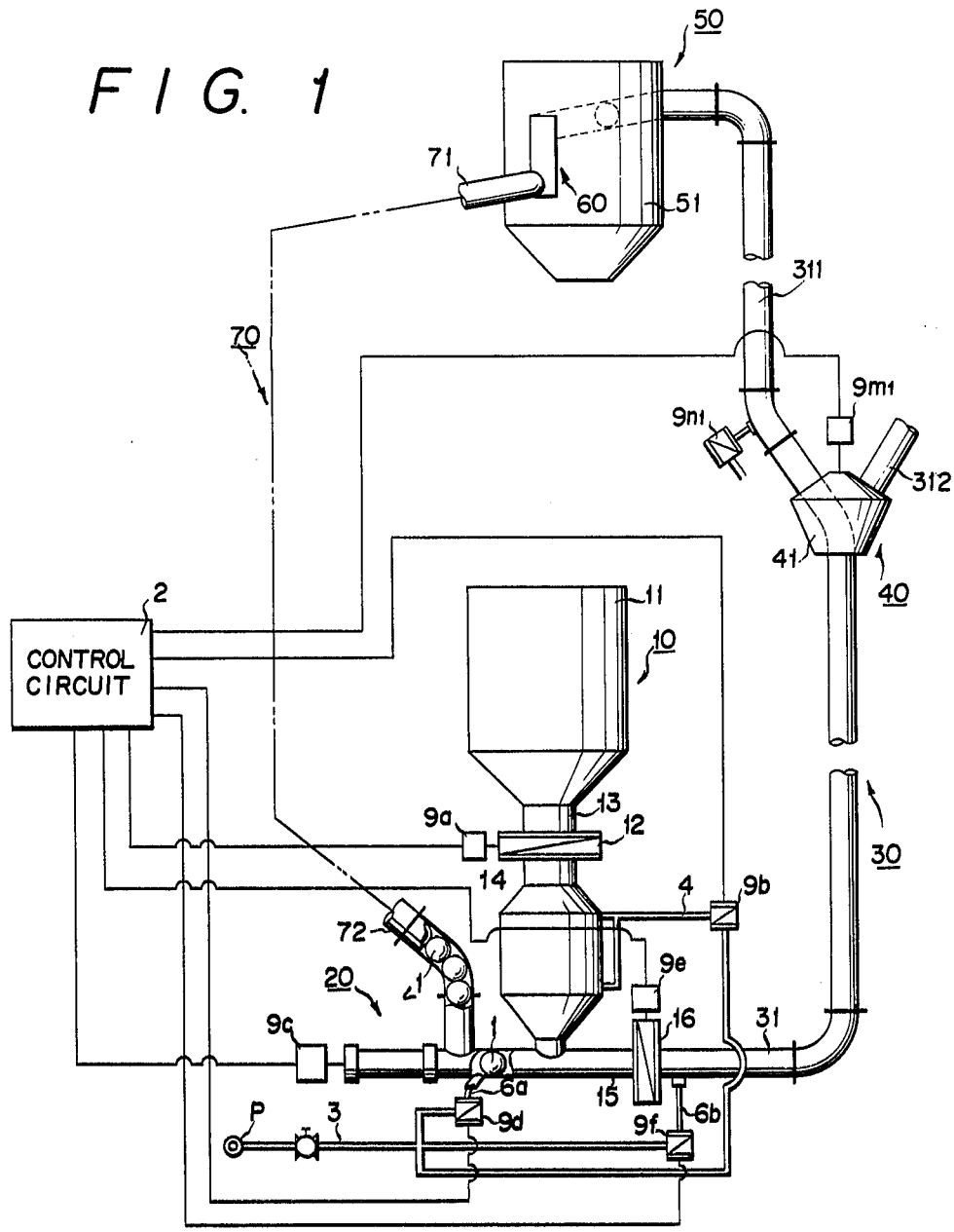
FIG. 1 is a schematic side elevational view of an apparatus for pneumatically transporting powdery or granular materials according to one embodiment of the present invention.

Referring to FIG. 1, which shows schematically the overall arrangement of an apparatus for pneumatically transporting powdery or granular materials according to the present invention, the apparatus comprises a material supply unit 10 for supplying a powdery or granular material to be transported, a secondary transport medium supply device 20 located adjacent to said material supply unit 10 for supplying one by one spherical secondary transport mediums 1 adapted to be delivered together with the material to be transported by the action of pneumatic presure, a transport pipeline 30 in which the material is carried with said secondary transport medium 1 to a desired position by the action of air or fluid under pressure, a material receiver unit 50 adapted to receive the material transported through the transport pipeline 30, a separation device 60 mounted within said material receiver unit 50 for separating said material from said secondary transport medium 1, and a secondary transport medium collecting device 70 for collecting the secondary transport medium 1 separated from the material and returning the same to the secondary transport medium supply device 20. Reference numeral 40 denotes a transport direction control device which comprises a directional control valve 41 disposed at a desired position in the transport pipeline 30 for changing the direction of transportation of the materials with the secondary transport medium 1 to a branch pipe 311 or 312.

The above-mentioned pneumatic pressure is generated by a compressor "P" and is supplied through conduits 3, 4, 6a, 6b, etc. and solenoid operated valves 9b, 9d, 9f, $9n_1$, etc. installed therebetween to the material supply unit 10, the secondary transport medium supply device 20, the transport pipeline 30 and the material receiver unit 50, respectively. The above-mentioned solenoid operated valves and a solenoid operated valve $9m_1$ for the directional control valve 41 are controlled properly by a control circuit 2.

The above-mentioned compenent parts constituting the apparatus of the present invention will now be hereinafter described in detail, in turn, with reference to FIG. 2 and other drawings.

Figure 2:
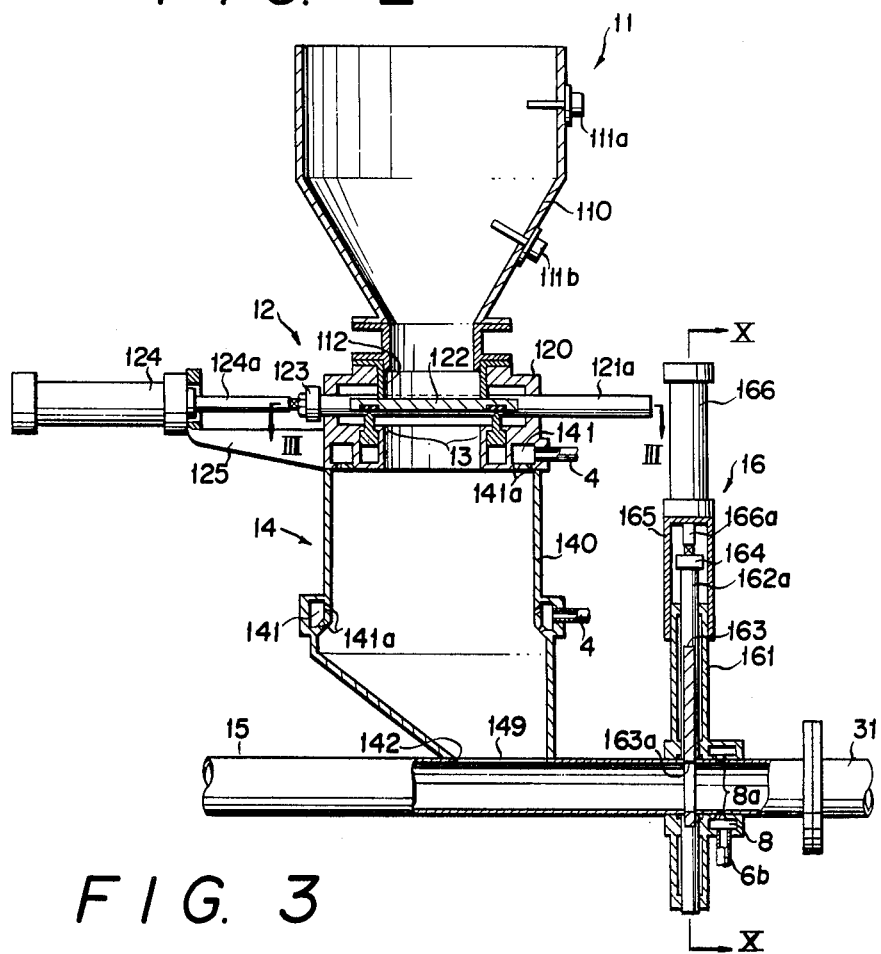
FIG. 2 is a fragmentary sectional view showing a material supply unit of the apparatus.
Figure 3:
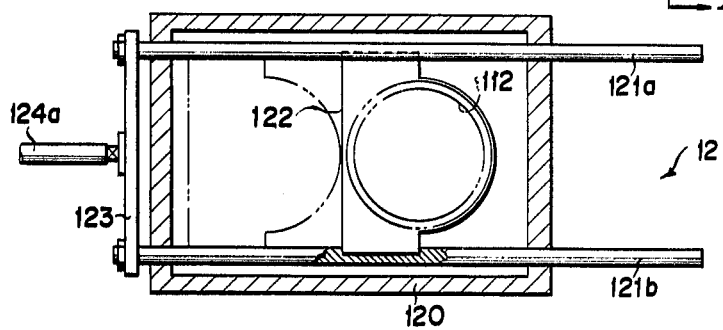
FIG. 3 is a transverse sectional view taken along line III — III in FIG. 2 showing one example of a hopper gate arrangement in the material supply unit.
Figure 11:
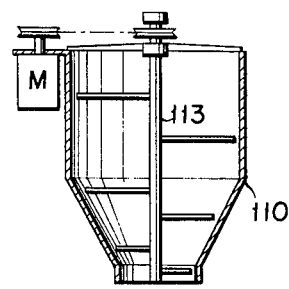
FIG. 11 is a fragmentary vertical sectional view showing another embodiment of the hopper arrangement in the material supply unit.

FIG. 2 is an enlarged vertical sectional view of the material supply unit 10. Reference numeral 11 denotes a hopper arrangement for accommodating a powdery or granular material to be transported, which comprises a hopper body proper 110, level gauges 111a and 111b for permitting the accumulation of a predetermined amount of the material within the hopper body 110 and a material drop port 112 formed in the lower part of the hopper body 110 through which material drops. The drop port 112 of the hopper arrangement 11 is connected to a pressure chamber arrangement 14 through a hopper gate arrangement 12 and a seal mechanism 13. As shown in FIG. 3, the hopper gate arrangement 12 comprises a rectangular casing 120 surrounding the material drop port 112 of the supply hopper body 110 and being situated above the pressure chamber arrangement 14 and a pair of guide rods 121a and 121b slidably inserted in parallel relationship to each other into the casing 120, the pair of guide rods 121a amd 121b having fixedly secured therebetween a baffle plate 122 adapted to open and shut the material drop port 112 of the hopper arrangement 11. The guide rods 121a and 121b have a transverse rod 123 fixedly secured to respective one of the ends of the pair of guide rods 121a and 121b. Fixedly secured to the transverse rod 123 is a leading end of a piston rod 124a of a piston-cylinder assembly 124 for moving the baffle plate 122 to open and shut the material drop port 112, and the piston-cylinder assembly is fixedly secured to a bracket 125 projecting outwardly from the casing 120. If unrunning materials such as those having a high viscosity are applied, the supply hopper body can be provided therein with a stirring mechanism 113 as shown in FIG. 11.

Figure 4:
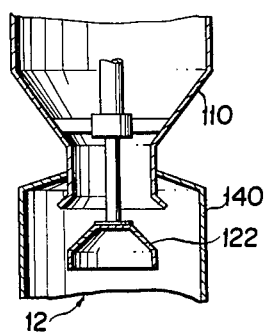
FIG. 4 is a vertical sectional view showing another embodiment of the hopper gate arrangement.

The baffle plate 122 of the hopper gate arrangement 12 may be so constructed as to be moved vertically to open and shut the opening 112 as shown as FIG. 4.

The pressure chamber arrangement 14 has annular pressurized air or gas inlet passages 141 formed in the upper part and in the position slightly lower than the vertically intermediate part thereof. The pneumatic pressure can be supplied through the conduit 4 into the inlet passages 141, and the pneumatic pressure supplied into the inlet passages 141 can be ejected through a plurality of nozzles 141a formed in the inner wall of a pressure chamber body proper 140 into the latter. Whilst, the lower part of the pressure chamber body 140 is made in gradually reduced diameter, and a lower opening 142 thereof is formed in approximately intermediate part of a supply pipe 15. Installed in the lower opening 142 of the pressure chamber 140 is a transverse rod or rods for preventing the secondary transport medium 1 from entering into the pressure chamber body 140. The supply pipe 15 extend in a substantially horizontal direction, and is connected on one side thereof with the secondary transport medium supply device 20 and on the other side thereof with a transport pipe 31 through a pipe gate mechanism 16.

Figure 5:
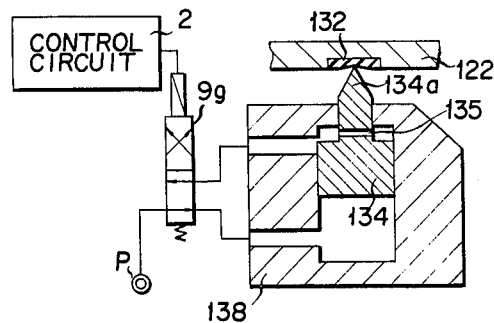
FIG. 5 is a fragmentary vertical sectional view showing one embodiment of a seal mechanism for a pressure chamber within the material supply unit.
Figure 6:
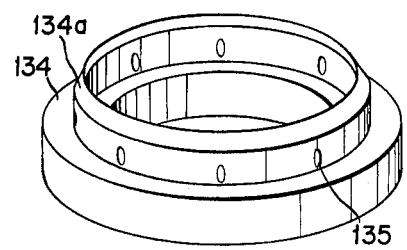
FIG. 6 is a perspective view of a seal ring member adapted for use in the seal mechanism.

The seal mechanism 13 in the pressure chamber arrangement 14 will now be described below with reference to FIGS. 5 and 6.

The baffle plate 122 of the above-mentioned hopper gate mechanism 12 has a resilient seal member 132 made of, for example, rubber or the like adapted to be inserted or enbedded in the baffle plate 122 with only the lower face thereof to be exposed. Under the seal member 132 and in the casing 120 pneumatic or oil hydraulic cylinder chamber with upper and lower pressurized air inlet-outlet ports 138 are provided in annular arrangement. Accommodated within the cylinder chamber 138 is an annular seal ring 134 associated therewith. An annular seal portion 134a projects upwardly from the upper surface of the seal ring 134. The seal portion 134a is formed at the distal end thereof in the shape of a sharp edge and has a plurality of comminicating holes 135 formed in the base portion thereof. The bottom and head sides of the cylinder chamber 138 which accommodates the seal ring 134 are so arranged as to be supplied with fluid under pressure through the action of a solenoid operated valve 9g. FIG. 6 is a perspective view showing the entire seal ring 134.

Figure 7A:
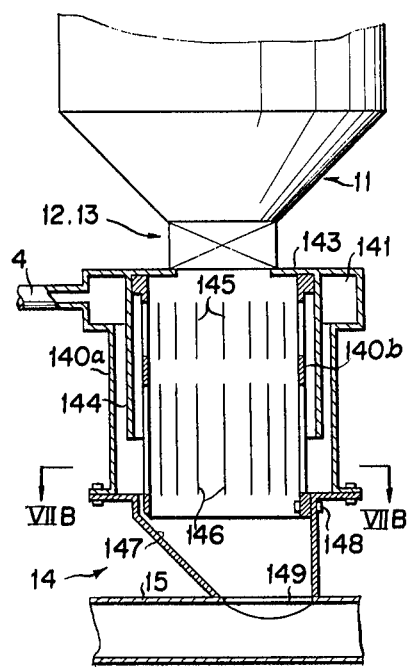
FIG. 7A is a fragmentary vertical sectional view showing another embodiment of the pressure chamber.
Figure 7B:
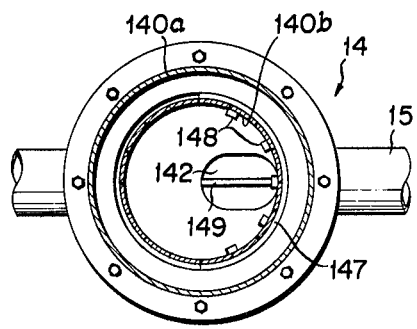
FIG. 7B is a transverse sectional view taken along line VIIB — VIIB in FIG. 7A.

Another preferred embodiment of the pressure chamber arrangement 14 is shown in FIGS. 7A and 7B. Stating in brief, the pressure chamber arrangement 14 has its body 140 comprising a cylindrical outer shell 140a and an inner shell 140b disposed within the outer shell 140a, and a baffle shell 144 extends between the outer and inner shells 140a and 140b from an upper face plate 143 to an approximately intermediate part of the body 140. Defined in the upper part of a space formed between the outer shell 140a and the baffle shell 144 is an annular nozzle chamber 141, and also the lower part of the outer shell 140a is formed in a reverse conical shape and is connected with the supply pipe 15. Further, the inner shell 140b has a plurality of slit-shaped air ejecting ports 145 and 146 formed at the upper and lower parts of the inner circumference thereof. The lower air ejecting ports 146 are slightly longer than the upper ones 145 so that the amount of ejection of air under pressure can be increased towards the lower part of the pressure chamber body 140. Defined between approximately one half of the lower peripheral part of the inner shell 140b and the tapered lower part of the outer shell 140a is an aperture 147 through which air under pressure can be ejected. Further, reference numeral 148 denotes fixing members for attaching about the other half of the lower peripheral part of the inner shell 140b to the outer shell 140a. According to this second embodiment, because of the concentration of air under pressure on the lower part of the inner shell 140b, deposition of powdery or granular materials on the lower part of the pressure chamber body 140 can be prevented so that a smooth transportation of the powdery or granular materials can be achieved.

Further, each of the air ejecting ports 145 and 146 may be formed in a nozzle as shown in the aforesaid first embodiment shown in FIG. 2.

Figure 8:
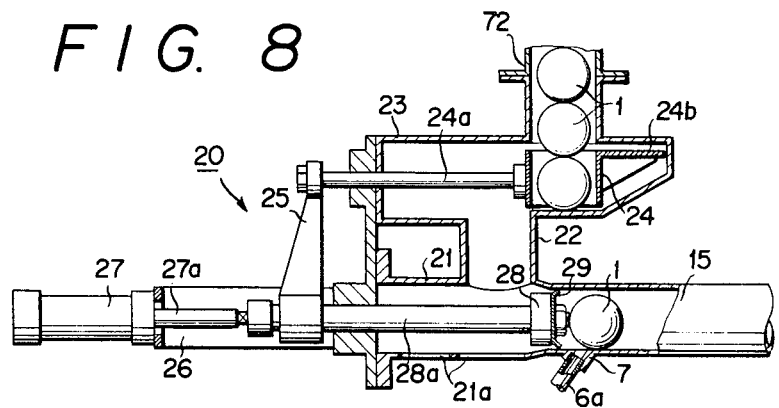
FIG. 8 is a fragmentary vertical sectional view showing one embodiment of a secondary transport medium supply device.

A first embodiment of the secondary transport medium supply device 20 will now be hereinafter described in detail with reference to FIG. 8.

The above-mentioned secondary transport medium supply device 20 comprises an accommodating pipe 21 with a diameter slightly larger than that of the supply pipe 15, a drop pipe 22 installed above and connected with the accommodating pipe 21, and a carrier pipe 23 connected through the drop pipe 22 with the accommodating pipe 21. Connected with one end of the carrier pipe 23 is an accumulation pipe 72 of the secondary transport medium collecting device 70 for accumulating the secondary transport medium 1 returned thereinto. Installed within the carrier pipe 23 is a carrier 24 for accommodating the secondary transport medium 1 which intermittently drops one by one from the accumulation pipe 72 by the action of the following arrangement. Namely, fixedly secured to the carrier 24 is one end of a first actuating rod 24a. The other end of the first actuating rod 24a passes through and projects outside the carrier pipe 23 and is fixedly secured to the upper end of a support rod 25, the lower end of which is fixedly secured to one end of a second actuating rod 28a which projects from one end of the above-mentioned accommodating pipe 21. Fixedly secured to one end of the second actuating rod 28a is a leading end of a piston rod 27a of a secondary transport medium supply piston-cylinder assembly 27 carried by a bracket 26 so that the second actuating rod 28a can effect reciprocatory movement together with the first actuating rod 24a for the carrier 24. The end of the second actuating rod 28a opposite to the end thereof adjacent to the support rod 25 is fixedly secured to a piston 28 provided at its forward end with a lip seal 29. Further, the carrier 24 has fixedly secured to the upper end thereof a base or support member 24b extending horizontally in the direction opposite to the first actuating rod 24a. Therefore, when the carrier 24 is moved within the carrier pipe 23 by the action of the secondary transport medium supply piston-cylinder assembly 27, the support member 24b can receive thereon another adjoining secondary transport medium 1 located above the secondary transport medium 1, which has been already accommodated within the carrier 24, so as to prevent the former medium 1 from dropping it into the drop pipe 22. Thus, the carrier 24 can always accommodate the secondary transport medium 1 one by one. Moreover, reference numeral 21a represents an elongated groove formed in the longitudinal direction of the bottom of the accommodating pipe 21 for enabling powdery or granular material to be dropped therefrom.

Figure 9A:
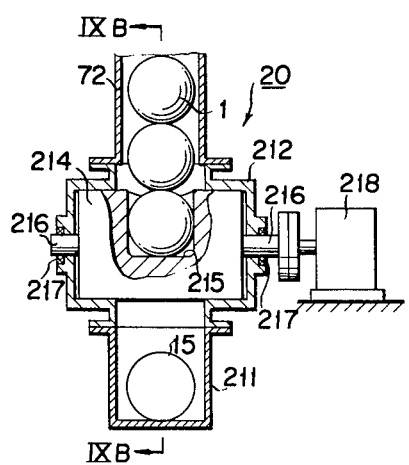
Figure 9B:
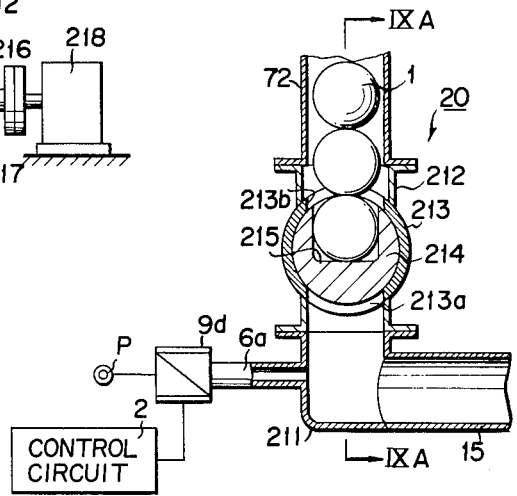

A second embodiment of the above-mentioned secondary transport medium supply device 20 will now be hereinafter described in detail with reference to FIGS. 9A and 9B. The second embodiment shown in FIGS. 9A and 9B has a casing which comprises a first casing 211 connected with the rear end portion of the supply pipe 15 and a second casing 212 connected between the first casing 211 and the accumulation pipe 72 for accumulating the second transport mediums 1. Fixedly secured to the second casing 212 is an outer cylindrical member 213 having opening 213a and 213b formed at the upper and lower portions thereof. Mounted rotatably and in air tight within the outer cylindrical member 213 is a rotary member 214 having formed in a part of the peripheral surface a recess adapted to accommodate secondary transport medium 1 one by one. Both ends of a shaft 216 extending from both ends of the rotary member 214 are journaled by means of bearing 217. The rotary member 214 is adapted to be rotated by a rotary driving power source 218 connected to one end of the shaft 216.

The upper part of the outer cylindrical member 213 in the vicinity of the upper opening 213 is connected to the leading end of the aforementioned recovery pipe 72 so that the spherical secondary transport medium 1 can be supplied one by one into the recess 215 of the rotary member 214.

Thus, one of the spherical secondary transport mediums 1 intermittently supplied through the accumulation pipe 72 can be accommodated within the recess 215 of the rotary member 214 and rotated by one half revolution along the rotation of the rotary member 214 by the rotary driving power source 218. When the recess 215 is registered with the lower opening 213a of the outer cylindrical member 213, the spherical secondary transport medium 1 located within the recess 215 is permitted to drop into the first casing 211, and then it is moved within the supply pipe 15 so as to be urged against the rear of the material to be transported by the action of air under pressure supplied through air ejection port 5 so that the powdery or granular material may be fed under pressure into the transport pipe 31. Further, at that time, since the supply pipe 15 is kept in air-tight because of the tight engagement of the outer cylindrical member 213 with the rotary member 214, there is no possibility of leakage of the air under pressure supplied into the supply pipe 15. This embodiment has a comparatively simple structure, however, can ensure the supply of the spherical secondary transport medium 1 from the accumulation pipe 72 into the supply pipe 15.

Figure 10:
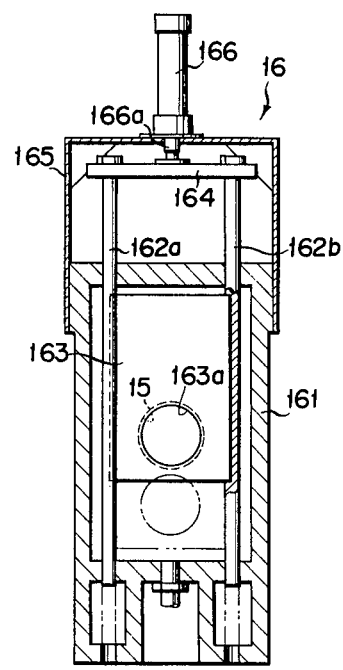
FIG. 10 is a fragmentary vertical sectional view taken along line X — X in FIG. 2 showing one embodiment of a pipe gate arrangement.

FIG. 10 is an elevational sectional view of the pipe gate arrangement 16 taken along line X — X in FIG. 2. Referring to FIGS. 2 and 10, the pipe gate arrangement 16 located on the side of the supply pipe 15 in the vicinity of the transport pipe 31 has a valve cage 161 extending in the direction at right angles to the supply pipe 15. Mounted vertically within the valve cage 161 are a pair of guide rods 162a and 162b spaced apart from each other in parallel relationship to each other. Fixedly secured between these guide rods 162a and 162b is a plate valve 163 having formed therein a circular opening 163a with a diameter substantially equal to the inside diameter of the supply pipe 15, and the upper ends of the guide rods 162a and 162b are connected by a cross rod 164. A bracket 165 extends above the valve cage 161 and a gate piston-cylinder assembly 166 having a piston rod 166a is installed on the bracket 165. The cross rod 164 is fixedly secured at the central part thereof to a leading end of the piston rod 166a. Further, the valve cage 161 has a passage 8 for ejecting air under pressure located downstream of the plate valve 163 so as to surround the outer peripheral surface of the supply pipe 15. The passage 8 has formed in the inner side thereof a plurality of nozzles 8a opening towards the inside of the supply pipe 15 so that the air under pressure supplied through the aforementioned conduit 6b may be ejected through the nozzles 8a.

A first embodiment of the material receiver unit 50 and the separation device 60 will not be hereinafter described in detail with reference to FIGS. 12A, 12B and 13.

Figure 15:
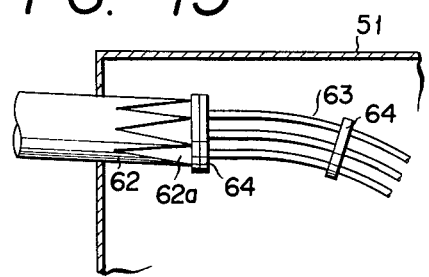
FIG. 15 is a fragmentary transverse sectional view showing still another embodiment of the separation device.
Figure 17:
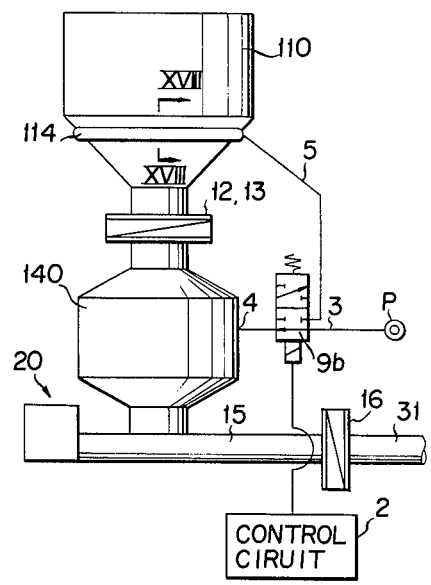
FIG. 17 is a fragmentary side elevational view showing one preferred embodiment of a residual pressure circulating device.
Figure 18:
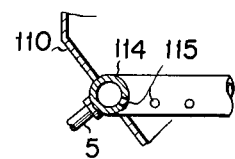
FIG. 18 is a fragmentary vertical sectional view taken along line XVIII — XVIII in FIG. 17.

In the drawings, reference numeral 51 denotes a box shaped body proper of material receiving hopper, and the branch transport pipe 311 is connected through a tapered pipe 61 with one side of the upper part of the body 51. The tapered pipe 61 has an inside diameter which is substantially equal to that of the transport pipe 15 at one end thereof adjacent to the latter and increases gradually towards the receiving hopper body 51. Connected with the end of the tapered pipe 61 on the side of the receiving hopper body 51 is a straight pipe 62 mounted within the latter. The straight pipe 62 comprises a plurality of wire ropes 62a bound in parallel to one another so as to form a cylindrical shape which the straight pipe 62 is integrally connected to a separation pipe 63 having the same shape as the former on one side of the latter. Further, the straight pipe 62 may be replaced by a pipe 62' having a plurality of notches 62'a formed in the peripheral surface thereof as shown in FIG. 15.

Whilst, the above-mentioned separation pipe 63 is curved at a radius "P" of curvature to form a circular arc and is fixedly secured by a plurality of annular retainer members 64 at two or more places. Moreover, the outermost part of the circular arc shaped pipe 63 is formed so as to define respective clearance or space 63b between the wire ropes 63a adjacent to each other so that the transported powdery or granular material may be readily separated and dropped through the clearance 63b into the material receiving hopper body 51. Further, the other end of the separation pipe 63 is connected with the upper part of a drop chamber 65 which is secured on one side of the material receiving hopper body 51 for permitting the secondary transport medium 1 transported together with the material to be dropped thereinto so as to further remove the material from the secondary transport medium 1. The bottom portion of the drop chamber 65 is inclined towards the hopper body 51 which is connected with a material drop port 65a formed in the side wall of the receiving hopper body 51. Mounted in the lower part of the chamber 65 is a net-shaped semicylindrical chute 66 inclined towards a collection pipe 71 of the collecting device 70 which is connected with one side of the lower part of the chamber. Further, reference numeral 52 denotes a vent pipe fitted to the uppermost part of the material receiving hopper body 51.

Figure 14:
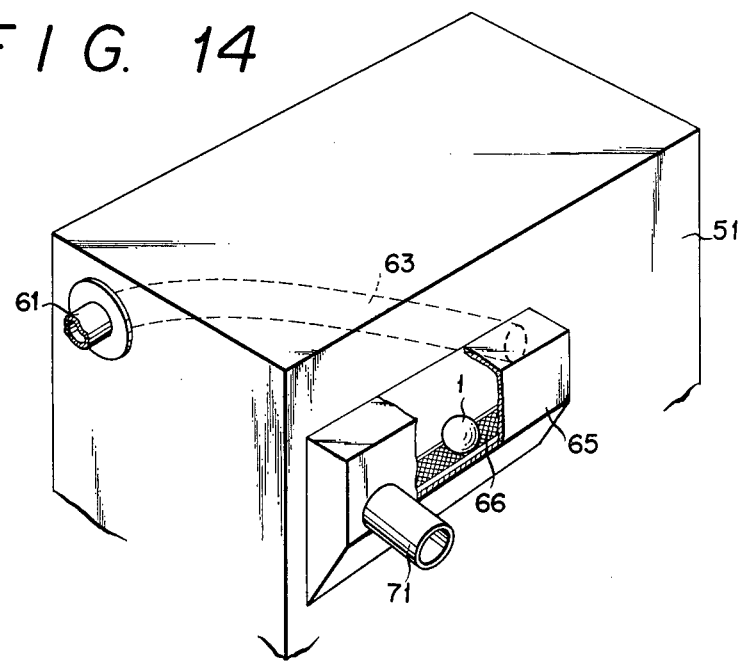
FIG. 14 is a fragmentary perspective view showing another embodiment of the separation device.

A second embodiment of the separation device 60 is illustrated in FIG. 14. In this second embodiment, the chamber 65 through which the powdery or granular material is permitted to drop extends transversely so that the secondary transport medium 1 which has passed through the separation pipe 63 may move on a comparatively long chute 66 while rotating thereon to the collection pipe 71. Thus, the powdery or granular material adhered to the secondary transport medium 1 can be separated by friction from the latter when it rolls on the above-mentioned relatively long chute 66.

As is similar to the foregoing solenoid operated valves, each of solenoid operated valves 9a, 9c and 9e respectively mounted in the piston-cylinder assemblies 27, 124 and 166 are controlled by the control circuit 2 also.

Next, the operation of the aforesaid apparatus of the present invention will be hereinafter described.

The powdery or granular material accommodated within the hopper arrangement 11 is permitted to drop in a predetermined amount through the lower opening 112 of the material supply hopper body 110 opened by the action of a signal fed by a control circuit 2 into a pressure chamber 140. After the dropping of the material, the baffle plate 122 of the hopper gate mechanism 12 is moved to close the opening 112 by the movement of the piston rod 124a of the piston-cylinder assembly 124, and at the same time the solenoid-operated valve 9g is energized so as to enable the supply of air or fluid under pressure into the bottom side of the cylinder 138 of the sealing means 13. As a result, the seal ring 134 is moved upwards so as to allow the leading end of the seal portion 134a to contact with the resilient seal member 132 fitted to the baffle plate 122, thus closing the pressure chamber 140 tightly.

The spherical secondary transport medium 1 is permitted to drop one by one from the carrier 24 of the spherical secondary transport medium supply device 20 into the accommodating pipe 21, and then is pushed from the accommodating pipe 21 into the supply pipe 15 so as to be located right behind the powdery or granular material inside the supply pipe 15 by the action of the piston-cylinder assembly 27. At the same time, the lip seal 29 of the piston 28 closes the opening of the supply pipe 15 adjacent the accommodating pipe 21.

After the upward movement of the plate valve 163 of the pipe gate arrangement 16 to open the passage, air under pressure is ejected through the nozzles 141a into the pressure chamber 140. Thus, the powdery or granular material accommodated within the pressure chamber 140 can be charged through the lower opening 142 of the pressure chamber 140 into the supply pipe 15. When, under such condition, air under pressure is fed through the nozzle 7 into the supply pipe 15, the powdery of granular material inside the supply pipe 15 is fed under pressure into the transport pipe 31 while it is being pushed by the secondary transport medium 1. When the secondary transport medium 1 has passed through the pipe gate arrangement 16, the plate valve 163 of the latter is moved downwards to shut off the passage by the action of the valve plate actuating piston-cylinder assembly 165. At the same time, the seal ring 134 of the sealing means 13 is moved apart from the baffle plate 122 of the hopper gate arrangement 12 by the operation of the solenoid-operated valve 9g, and thereafter the above-mentioned operation is repeated so as to send out a predetermined amount of the powdery or granular material together with the secondary transport medium 1, in turn, into the transport pipe 31.

Whilst, the powdery or granular material and the secondary transport medium 1 which have passed through the pipe gate arrangement 16 are fed under pressure by the pressurized fluid ejection nozzle 8a provided in the end of the supply pipe 15 close to one end of the transport pipe 31, and then are fed by the directional control valve 41 of the transport direction control 40 through the branch pipe 311 into the material receiver unit 50. Further, the transport pipeline 30 is provided at any desired position with a pressurized fluid ejection nozzle which is permitted to communicate through a solenoid-operated valve with the conduit 3 for supplying air or fluid under pressure so that even if the transport pipe 31 or 311 is considerably long in the vertical direction, there is no inconvenience for the transportation of the powdery or granular material and the secondary transport medium 1.

The powdery or granular material and the secondary transport medium 1 which have arrived at the material receiver unit 50 are separated from each other by means of the separation device 60 mounted within the material receiver unit so that only the powdery or granular material is permitted to drop into the hopper body 51, whilst only the spherical secondary transport medium 1 may be returned through the collection pipe 71 of the secondary transport medium collecting device 70 into the secondary transport medium supply device 20. Stating in more detail, when the powdery or granular material fed by the action of air under pressure within the transport branch pipe 311 through the movement of the spherical secondary transport medium 1 has arrived at the tapered pipe 61 connected with the branch pipe 311, it is gradually decelerated because part of the air under pressure leaks into the material receiving hopper body 51. Further, when the powdery or granular material has further arrived at the straight pipe 62 within the hopper body 51, the air under pressure is released so that the powdery or granular material and the secondary transport medium 1 are decelerated so much, and then reach the separation pipe 63. For this reason, the wear-down of the separation pipe 63 due to the collision of the powdery or granular material and the secondary transport medium 1 against the former may be reduced substantially. At the same time, most of the powdery or granular material is released through the outermost clearance 63b of the separation pipe 63 formed in a circular arc into the material receiving hopper body 51, and therefore the possibility of collision of the powdery or granular material against the wire ropes 63a constituting the separation pipe 63 can be reduced so much. The spherical secondary transport medium 1 separated from the powdery or granular material by the action of the separation device 50 can be returned through the chamber 65 into the collection pipe 71.

Figure 16:
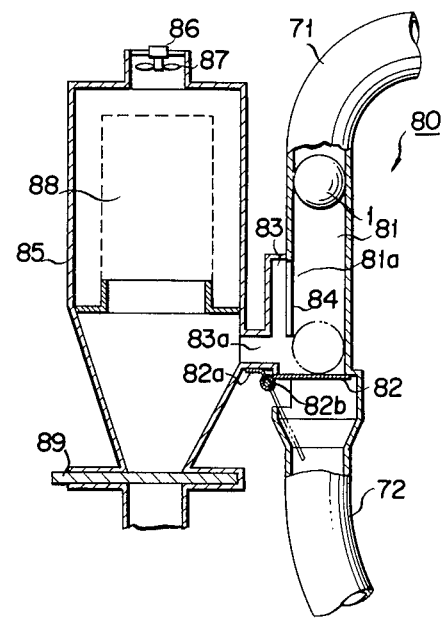
FIG. 16 is a fragmentary vertical sectional view showing one preferred embodiment of a material removing device.

The apparatus set forth hereinabove is sufficiently effective for the transportation of powdery or granular materials having a considerably low viscosity, however, in the case of transportation of powdery or granular material having a considerably high viscosity, there is a tendency of their adhesion to the hopper body or the inside wall of the transport pipe and further to the periphery of the second transport medium 1 which cannot be separated by the abovementioned separation device. In particular, the return of the secondary transport medium 1 having powdery or granular material adhering to the peripheral part thereof to the supply device 20 causes a trouble. In order to eliminate such disadvantage, the transport apparatus of the present invention can be fitted with the following arrangement in a simple operation. Stating in brief, a powdery or granular material removing device 80 as shown in FIG. 16 and which will be described below can be provided between the above-mentioned collection pipe 71 and the accumulation pipe 72 for the secondary transport mediums 1: to achieve the aforesaid purpose. The structure of the powdery or granular material removing device 80 is as shown in FIG. 16, that is; a separation chamber 81 is installed between the secondary transport medium collection pipe 71 and the accumulation pipe 72. At the bottom part of the separation chamber 81, a plate 82 adapted to be biased in its horizontal position by the force of a spring 82a is carried by a pin 82b. The plate 82 is constructed such that it can normally close the bottom part of the separation chamber 81 by the action of the spring 82a and is moved downwards against the biasing force of the spring 82a by the dead load of the spherical secondary transport medium 1 only during the passage of the latter.

Whilst, the separation chamber 81 has an opening 81a formed in the peripheral wall thereof so that the separation chamber 81 is permitted to communicate with a suction chamber 83 through the opening 81a. The opening 81a has a longitudinally extending guide rod 84 installed therein to prevent the spherical secondary transport medium 1 to be drawn thereinto. Further, the lower part of the suction chamber 83 communicates through a passage 83a with the lower side of a powdery or granular material collection hopper 85. A fan 87 adapted to be rotated by an electric motor 86 is installed in the upper part of the collection hopper 85 so that the air inside the suction chamber 83 can be sucked out through a bag filter 88 (which may be replaced by a cyclone) detachably mounted within the collection hopper 85. Further, the powdery or granular material sucked in the collection hopper 85 can be taken out by moving the sliding plate 89 located in the lower part of the collection hopper 85 to open the passage.

Thus, when the spherical secondary transport medium 1 accommodated in the collection pipe 71 passes through the separation chamber 81 of the removing device 80, the powdery or granular material adhered to the secondary transport medium 1 is sucked through the opening 81a into the suction chamber 83. The spherical secondary transport medium 1 which has passed through the separation chamber 81 will move down the plate 82 by its dead load, and return through the accumulation pipe 72 into the spherical secondary transport medium supply device 20. While, the powdery or granular material sucked in the suction chamber 83 is accommodated in the collection hopper 85, and when a proper amount of the powdery or granular material has accumulated in the collection hopper 85, it can be taken out from the latter by moving the sliding plate 89 to open the passage.

Further, the air suction force of the fan 87 installed on the uppermost part of the collection hopper 85 is set to a range for ensuring the downward movement or opening of the plate 82 by the dead load of the each of secondary transport mediums 1.

Besides the above-mentioned powdery or granular material removing device 80, the transport apparatus of the present invention can be provided with a residual pressure circulating mechanism which will be mentioned below for the purpose of promoting the dropping of the powdery or granular material into the pressure chamber 140 of the material supply hopper arrangement 11.

Stating more specifically, the solenoid-operated valve 9b installed between the pressurized fluid conduits 3 and 4 is replaced by a solenoid-operated directional control valve, and further, a bypass conduit 5 is installed between the solenoid-operated directional control valve 9b and the material supply hopper body 110. The terminal end of the bypass conduit 5 communicates with an annular nozzle pipe 114 installed in the portion slightly lower than the intermediate portion of the above-mentioned material supply hopper body 110 and in the peripheral part thereof. The nozzle pipe 114 has on the inner side thereof a plurality of pressurized air ejection holes 115 opening obliquely and downwardly of the material supply hopper body 110 and which are spaced apart in the circumferential direction of the hopper. The above-mentioned bypass conduit 5 may be connected with not only the material supply hopper body 110 but also the separation hopper body 51 and the transport pipeline 30.

Thus, after the powdery or granular material within the supply pipe 15 is transferred into the transport pipe 31, the pipe gate arrangement 16 is shut off. Under such condition, fluid pressure remains within the pressure chamber 140. When the solenoid-operated valve 9b for supplying air under pressure into the pressure chamber 140 is deenergized, the air or fluid under pressure within the pressure chamber 140 will flow back into the raw material supply hopper body 110 thereby agitating the powdery or granular material within the hopper body 110 and promoting the dropping of the material into the pressure chamber 140. By doing so, even powdery or granular materials having a high viscosity is permitted to drop readily into the pressure chamber 140.

An example in which the apparatus of the present invention is employed will now be described below.

EXAMPLE 1

Table 1

| Title Comparative Items | Transportation by the apparatus of the present invention | Comparative Examples | |
|---|---|---|---|
| | | Prior art plug transportation | Prior art transortation by floatation |
| Principle of Transportation | Forced plug by sphere (static pressure plus effect of leaking air) | plug (static pressure) | Floatating in or entrained by air current (dynamic pressure) |
| Form of transportation | | | |
| Transportation speed | 5 M/S | 10 M/S | 20 – 40 M/S |
| Material to be transported adhesion | possible ○ | possible △ | impossible |
| wearing property | possible ○ | possible △ | impossible |
| Entry of foreign matters | possible ○ | possible △ | impossible |
| Application to casting sand | possible ○ | possible △ | impossible |

(Mark ○ indicates excellent performance, and △ ordinary performance.)

As is clear from the above Table 1, both the apparatus of the present invention and the prior art plug transportation permit powdery or granular materials to be formed in the form of plug and flow in the transport pipe; however, according to the prior art plug transportation, it was possible to transport powdery or granular materials under extremely limited conditions, because it depends largely on various factors such as, for example, the physical property of the material to be transported, the diameter of the transport pipeline, the amount of air or fluid supplied, and the method of supplying air under pressure etc. In contrast to this, according to the transportation system through the spherical secondary transport medium according to the apparatus of the present invention, a plug is forcibly created by the action of the transport medium so that transportation of powdery or granular materials can be effected in any condition. Further, the apparatus of the present invention is particularly characterized in that transportation at low speeds can be achieved.

While the invention has been described with reference to particular embodiments, it should be obvious that various changes and modifications are possible to those skilled in the art, so that it is intended that the invention be solely limited by the appended claim.

What is claimed is:

1. An apparatus for pneumatically transporting powdery or granular material from a material supply unit with a supply pipe to a material receiver unit through a transport pipeline connected between the supply pipe and the material receiver unit, comprising spherical secondary transport mediums each having a diameter slightly less than the inside diameter of said transport pipeline and adapted to be intermittently supplied by supply means into said supply pipe at a position just behind the material to be transported, separation means provided within said material receiver unit for separating the transported material from said transport mediums, and collection means provided between said supply means and said separation means so as to return said transport mediums into said supply means, characterized in that said material supply unit comprises the combination of:
    a supply hopper arrangement with a material drop port formed in the lowermost part thereof, said supply hopper arrangement being mounted on the uppermost part of said material supply unit for accommodating therein the material to be transported;
    a pressure chamber arrangement with upper and lower opening, said pressure chamber arrangement being provided under the material drop port of said supply hopper arrangement and being fixedly connected at the lower opening thereof to a substantially intermediate portion of said supply pipe for pressurizing the material supplied thereinto from said supply hopper arrangement by the action of airflow under pressure;
    a hopper gate arrangement provided between said supply hopper arrangement and said pressure chamber arrangement for opening and shutting the material drop port of said supply hopper arrangement; and
    a pipe gate arrangement provided in and mounted on said supply pipe on the side of the distal end of the latter for opening and airtightly shutting said supply pipe,
and in that said supply means for supplying said spherical secondary transport medium comprises:
    a first casing fixedly connected to the proximal end of said supply pipe into which said transport medium is dropped one by one;
    a second casing fixedly connected between said first casing and said collection means for returning said secondary transport mediums to said supply means;
    an outer cylindrical hollow member having opening at upper and lower portions thereof, respectively, and fixedly secured to said second casing;
    a cylindrical rotary member having formed in a part of the peripheral surface thereof a recess adapted to contain one by one said secondary transport mediums therein, said rotary member being rotatably, airtightly inserted into said outer cylindrical hollow member and being provided at both ends thereof with shafts journaled by means of bearings installed within both side ends of side outer cylindrical hollow member; and
    a rotary driving power source connected to the end of one of shafts for rotating said rotary member.

2. An apparatus as set forth in claim 1, wherein said collection means for returning the spherical secondary transport medium to said supply means therefor comprises a collection pipe section connected at one end thereof to said separation means and an accumulation pipe section connected between said collection pipe section and said supply means for supplying said secondary transport medium.

3. An apparatus as set forth in claim 2, further comprising a material removing device provided between said collection pipe section and said accumulation pipe section which comprises:
    (a) a separation chamber connected between said collection pipe and said accumulation pipe sections;
    (b) a plate member carried at the bottom part of said separation chamber by a pin, said plate member being biassed in a horizontal pisition by the action of a sping when said spherical secondary transport medium is not dropped thereon, while said plate member being swung downwards about said pin against the biassing force of said spring by the dead load of said secondary transport medium when the latter is dropped on said plate member;
    (c) an opening formed in the peripheral wall of said separation chamber;
    (d) a suction chamber formed adjacent to said separation chamber and permitted to communicate with the latter through said opening;
    (e) a material collection hopper installed in the vicinity of said separation chamber and permitted to communicate with said suction chamber through a passage formed in the lower part of said suction chamber;
    (f) a bag filter detachably mounted within said material collection hopper;
    (g) a fan installed in the upper part of said material collection hopper for sucking through said bag filter the air in the separation chamber via said suction chamber and said passage;
    (h) an electric motor installed in the uppermost part of said material collection hopper for rotating said fan;
    (i) a sliding plate slidably located in the lower part of said material colloection hopper for opening and shutting a lower port of the latter; and
    (j) a guide rod vertically extending between said separation chamber and said suction chamber for preventing said secondary transport medium from being drawn into said suction chamber, wherein suction force of said fan is previously set in a range of ensuring the downward swing of said plate member by the dead load of said secondary transport medium, whereby the powdery or granular material introduced into said separation chamber with said secondary transport medium and allowed to adhere to the outer peripheral surface of said secondary transport medium is favourably removed.

4. An apparatus as set forth in claim 1, said separation means comprises:
   (a) a receiving hopper body of said material receiving unit, said hopper body being situated in position;
   (b) a tapered pipe supported by said receiving hopper body, one small diameter end thereof being fixedly secured to said transport pipeline so as to be permitted to airtightly communicate with the latter and the other large diameter end thereof being open to the inside of said receiving hopper body;
   (c) a straight pipe supported by and provided within said receiving hopper body, one end thereof being permitted to communicate with said tapered pipe on the side of said large diameter end of the same;
   (d) a separation pipe made of a plurality of wire ropes for separating therethrough the powdery or granular material transporrted thereat from said spherical secondary transport medium, one end thereof being integrally connected to the end of said straight pipe opposite to the side of said tapered pipe and the other end thereof being open to the outside of said receiving hopper body opposite to said tapered pipe;
   (e) a drop chamber fixedly mounted on said receiving hopper body so that said other end of a separation pipe is permitted to communicate with said drop chamber for dropping said spherical secondary transport medium separated from the material, said drop chamber is formed with an opening permitted to communicate with said collection means for collecting therethrough said spherical secondary transport medium dropped into said drop camber;
   (f) a net-shaped semicylindrical chute provided in the lower part of said drop chamber and arranged to be inclined towards said opening of said drop chamber; and
   (g) a material drop port formed in a side wall of said receiving hopper body at a position corresponding to the lowermost part said drop chamber, wherein a transporting speed of the powdery or granular material and said spherical secondary transport material is granually decelerated while passing through, in turn, said tapered pipe, said straight pipe and said separation pepe, thereby remarkably reducing a friction force caused between said pipes of the separation means and said spherical secondary transport medium.

5. An apparatus as set forth in claim 4, wherein said straight pipe is constructed by a plurality of wire ropes as is similar to said separation pipe.

6. An apparatus as set forth in claim 4, wherein said straight pipe is a pipe having at the forward end thereof a plurality of notches formed along the periphery thereof.

7. An apparatus as set forth in claim 4, wherein said plurality of wire ropes are cylindrically bound by a plurality of annular retainer members.

8. An apparatus as set forth in claim 4, wherein said drop chamber and said net-shaped semicylindrical chute are longitudinally extended along the longitudinal outside wall, thereby rolling on said longitudinally extending chute said spherical secondary transport medium droped thereon.

9. An apparatus as set forth in claim 1, wherein said supply hopper arrangement comprises a cylindrical supply hopper body for accumulating therewith the material to be transported and a plurality of level gauges attached to the inside of said hopper body proper for permitting said hopper body proper to accumulate the material in a predetermined amount.

10. An apparatus as set forth in claim 9, further comprising a stir mechanism for stirring the material accumilated within said supply hopper body.

11. An apparatus as set forth in claim 1, wherein said pressure chamber arrangement comprises:
   (a) a cylindrical pressure chamber body with upper and lower openings which is made in gradually reduced diameter in the lower part thereof;
   (b) first and second annular pressurized air inlet passages respectively formed in the upper part and in the position slightly lower than the vertically intermediate part of said pressure chamber body, said passages being respectively connected through conduit means with a solenoid operated directional control valve to a source of pressurized air;
   (c) a plurality of nozzles formed in the respective inner wall of said pressurized air inlet passages for ejecting airflow under pressure into the inside of said pressure chamber body; and
   (d) a transverse rod extending in parallel to said supply pipe from one end of said lower opening of the pressure chamber body to the other end opposite to said one end for preventing said spherical secondary transport medium from entering into the inside of said pressure chamber body.

12. An apparatus as set forth in claim 1, wherein said hopper gate arrangement comprises:
   (a) support means suspended by and within said supply hopper body;
   (b) a guide rod vertically extending from said support means and arranged coaxially with said material drop port of said supply hopper body;
   (c) a conical-trapezoidal baffle member fixedly secured to the distal end of said guide rod; and
   (e) a baffle member actuating piston-cylinder assembly vertically supported by said support means and having a vertically extending and retracting piston rod fixedly secured at its distal end to said guide rod.

13. An apparatus as set forth in claim 1, wherein said hopper gate arrangement comprises:
   (a) a rectangular casing surrounding said material drop port of said supply hopper body and being situated above said pressure chamber arrangement;
   (b) a pair of guide rods slidably inserted in parallel relationship to each other into said casing;
   (c) a baffle plate fixedly secured between said pair of guide rods for opening and shutting the material drop port;
   (d) a transverse rod fixedly connected between respective proximal ends of said pair of guide rods; and
   (f) a baffle plate actuating piston-cylinder assembly fixedly secured through a bracket to said casing, said pistoncylinder assembly having a piston rod fixedly secured at its leading end to said transverse rod.

14. An apparatus as set forth in claim 13, wherein said hopper gate arrangement further comprises a seal mechanism provided between said baffle plate and said pressure chamber arrangement for airtightly sealing up the inside of pressure chamber body after the material to be transported is dropped thereinto, said seal mechanism comprising:

(a) an annular resilient seal member adapted to be inserted or embedded in the lower surface of said baffle plate;

(b) an annular cylinder chamber with upper and lower pressurized air inlet-outlet ports which is formed in said casing and positioned under said annular resilient seal member; and (c) an annular seal ring vertically slidably inserted into said cylinder chamber, said seal ring having at an upper part thereof an annular seal portion formed at its distal end in the shape of a sharp edge and airtightly passing through and projecting upwardly from the casing for sealing coming into contact with said resilient seal member when pressurized air is supplied through said lower inlet-outlet into said cylinder chamber, and said seal ring further having a plurality of communicating holes formed in the base part of said annular seal portion.

15. An apparatus as set forth in claim 1, wherein said pipe gate arrangement comprises:
    (a) a valve cage fixedly mounted on said supply pipe and vertically extending in the upward direction at substantially right angle to said supply pipe;
    (b) a pair of guide rods vertically slidingly inserted in parallel to each other into said valve cage from the upper outside thereof;
    (c) a plate valve member having at an approximately intermediate portion thereof a circular opening with a diameter substantially equal to the inside diameter of the supply pipe;
    (d) a cross rod fixedly connected between respective proximal ends of said pair of guide rods;
    (e) a bracket fixedly secured to and extending upwards from said valve cage; and
    (f) a gate piston-cylinder assembly installed on said bracket and having a piston rod fixedly connected at the distal end thereof to said cross rod for actuating said plate valve member so as to open and shut the supply pipe.

16. An apparatus as set forth in claim 15, said pipe gate arrangement further comprises:
    (a) an annular passage formed within said valve cage downstream of said plate valve so as to surround the outer periphery of the supply pipe and permitted to communicate through conduit means with a solenoid operated directional control valve to the source of pressurized air; and
    (b) a plurality of nozzles formed in the inner wall of said valve cage and the peripheral wall of said supply pipe so as to permit the air communication between said annular passage and the inside of said supply pipe, whereby pressurized air is ejected from said nozzles to further advance the material to be transported and said spherical secondary transport medium toward the transport pipe line.

* * * * *